UNITED STATES PATENT OFFICE.

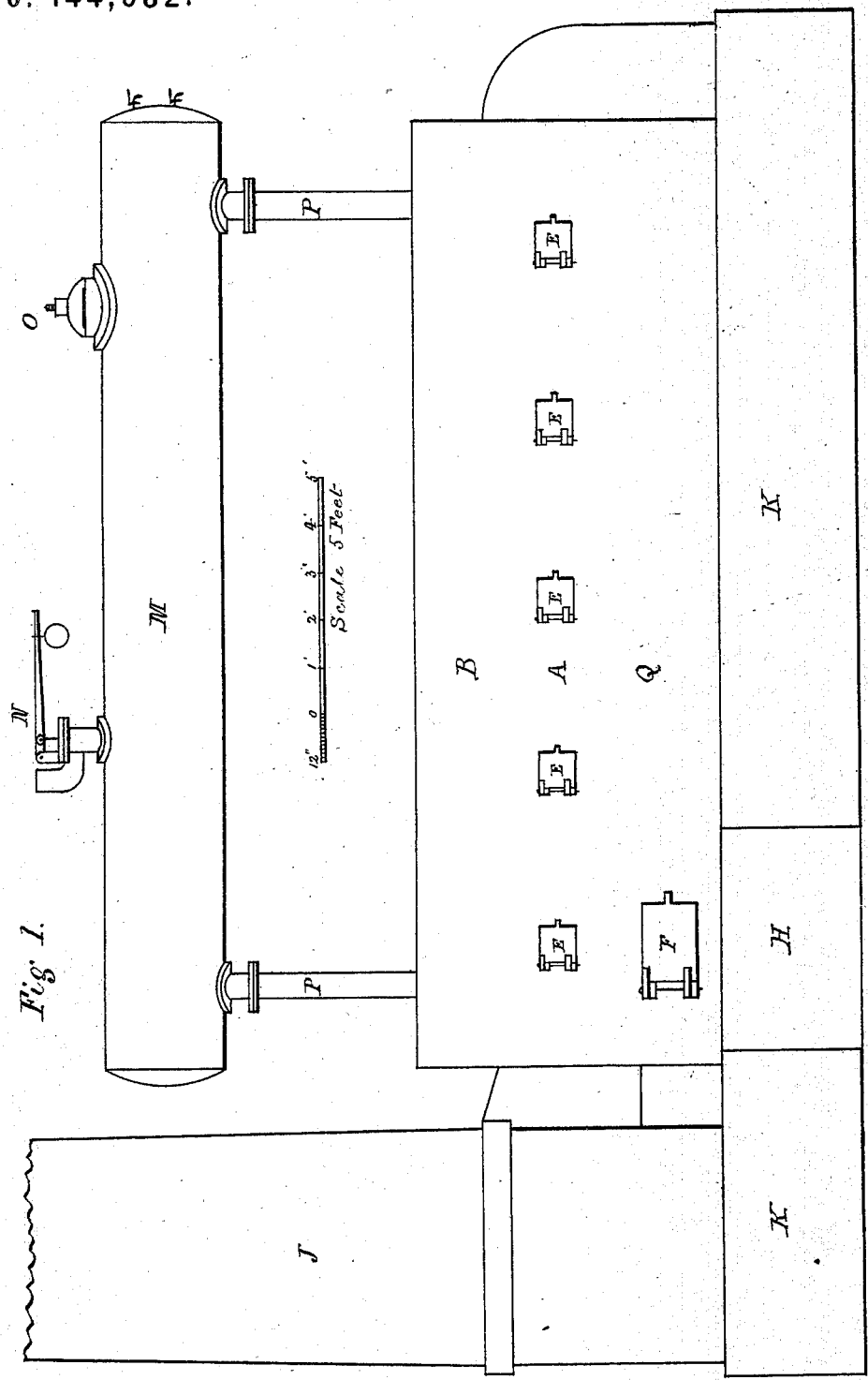

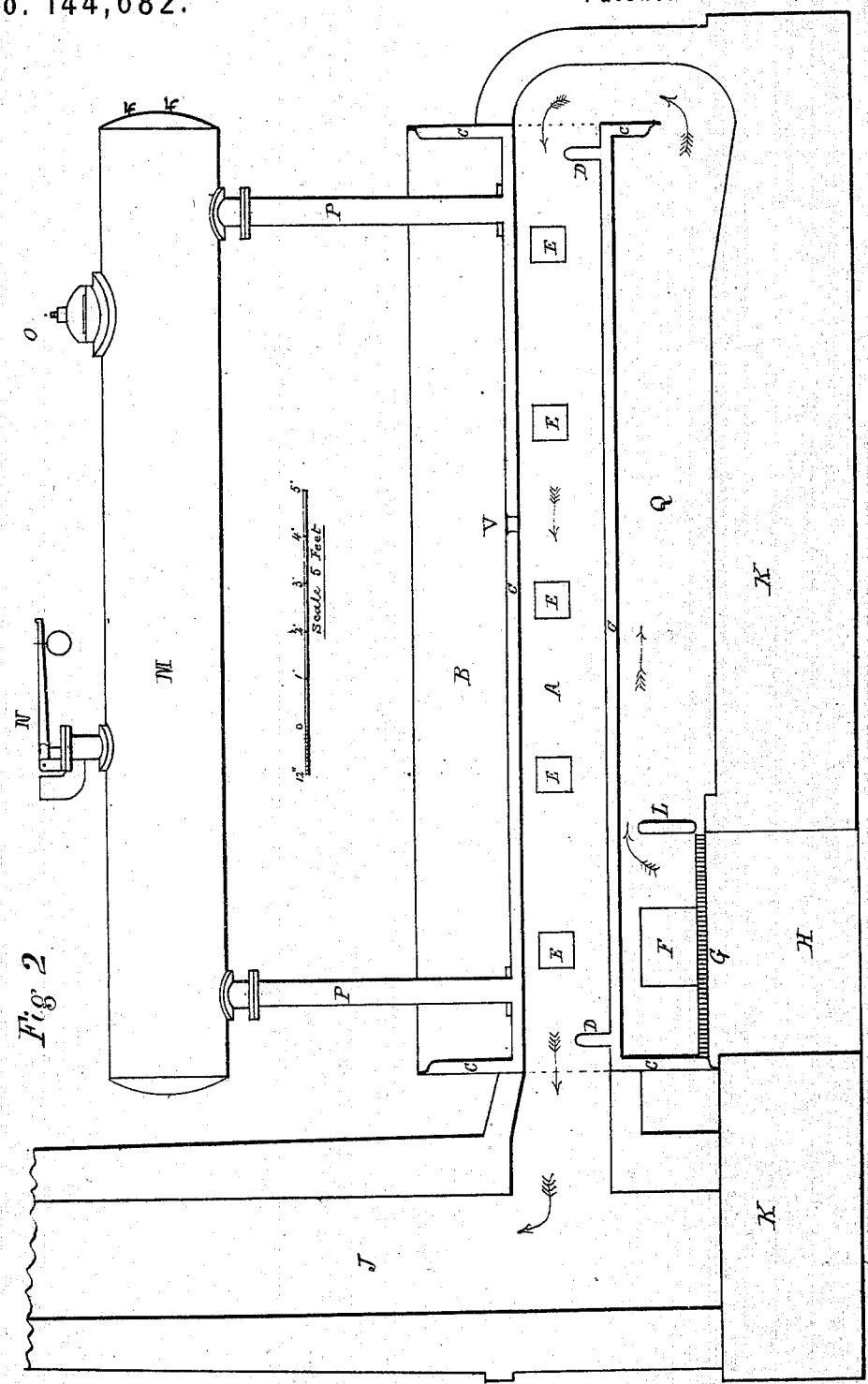

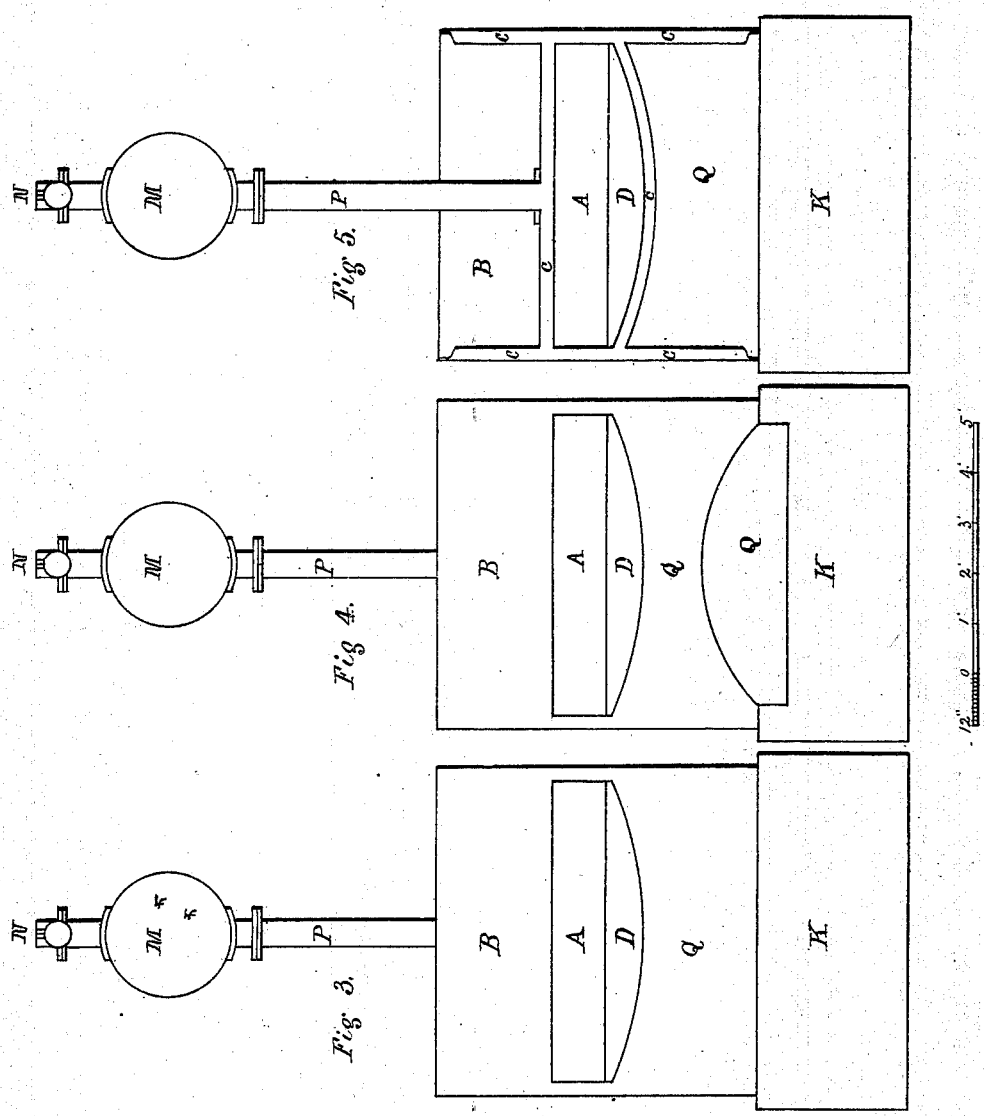

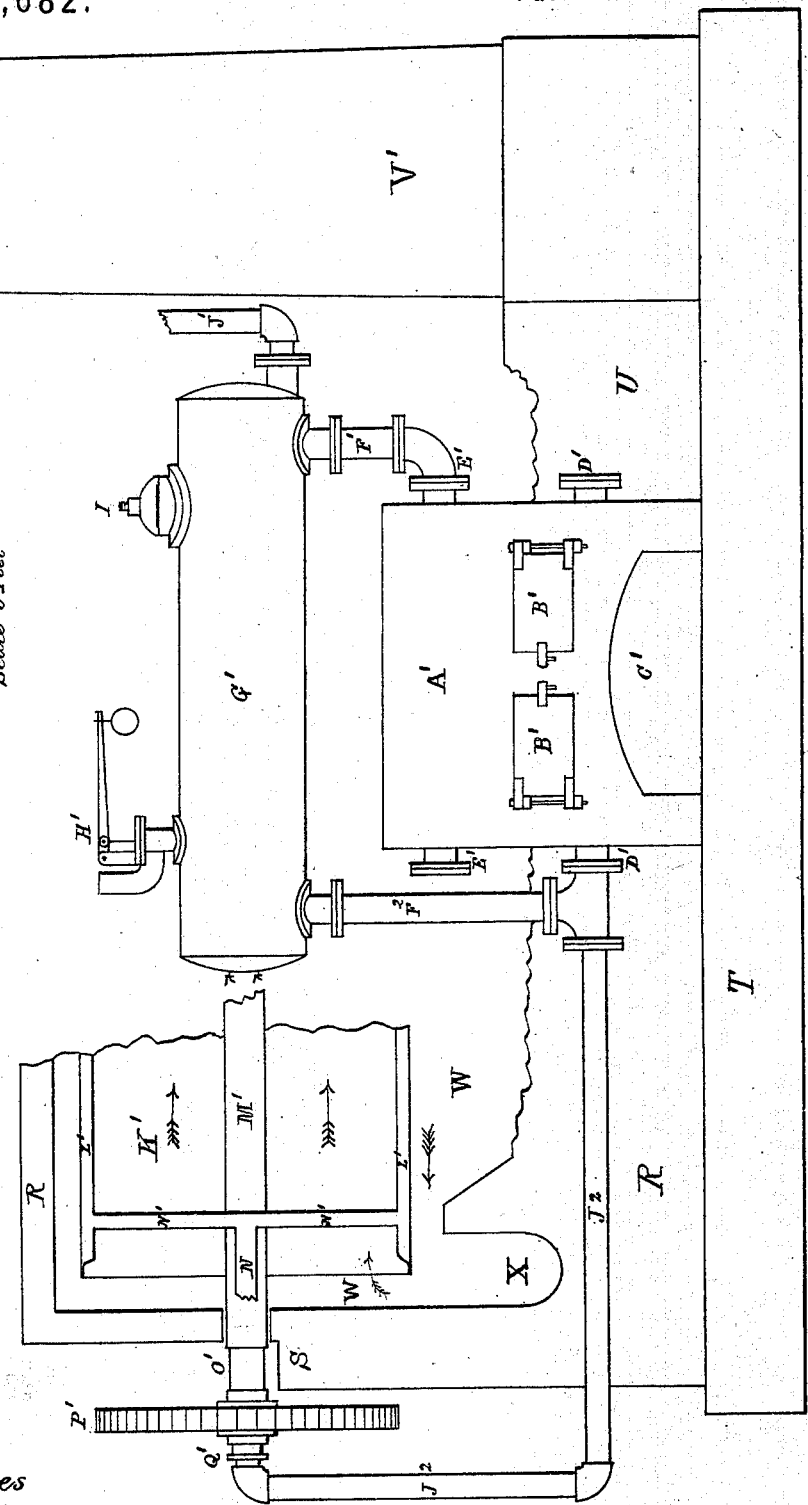

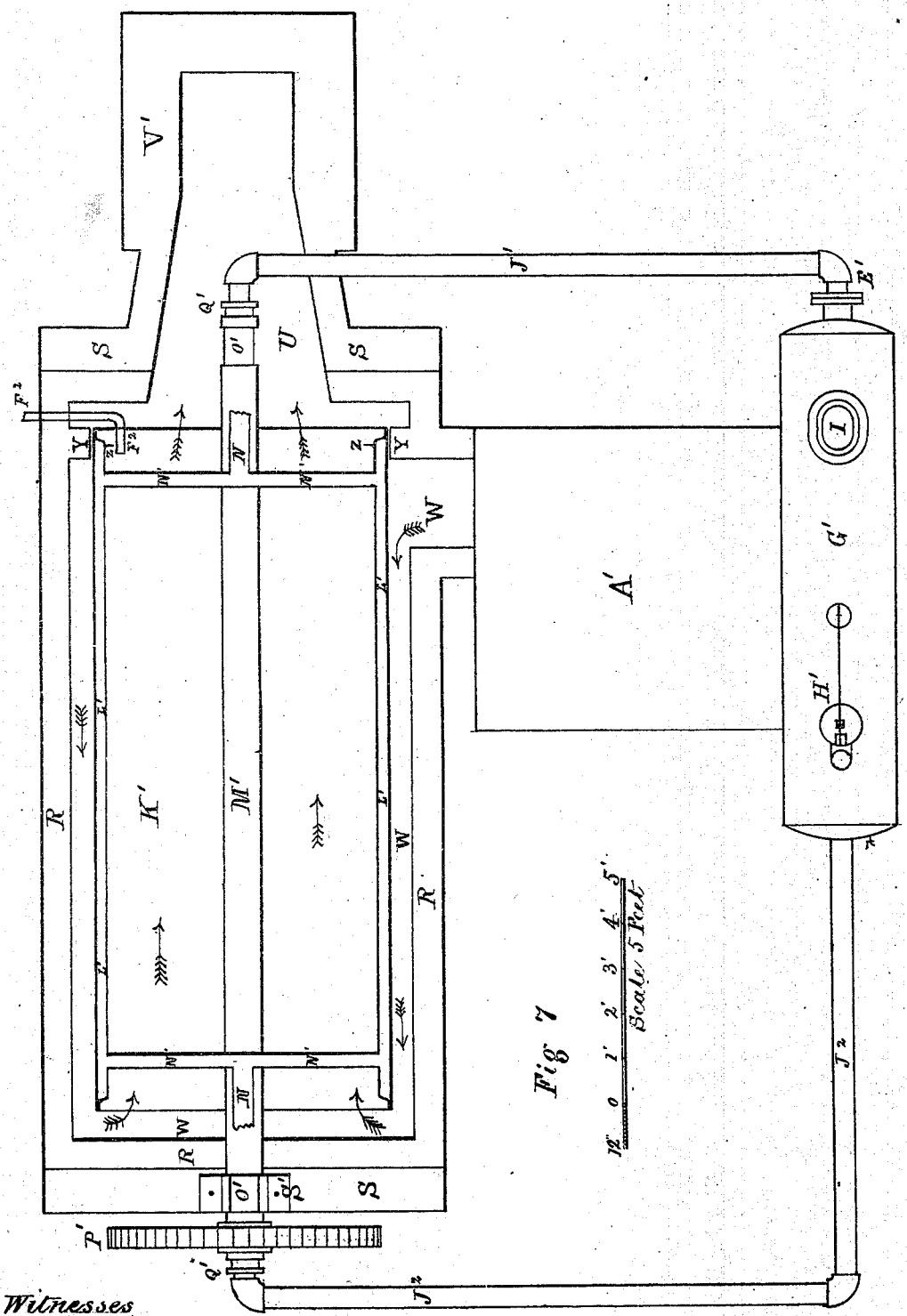

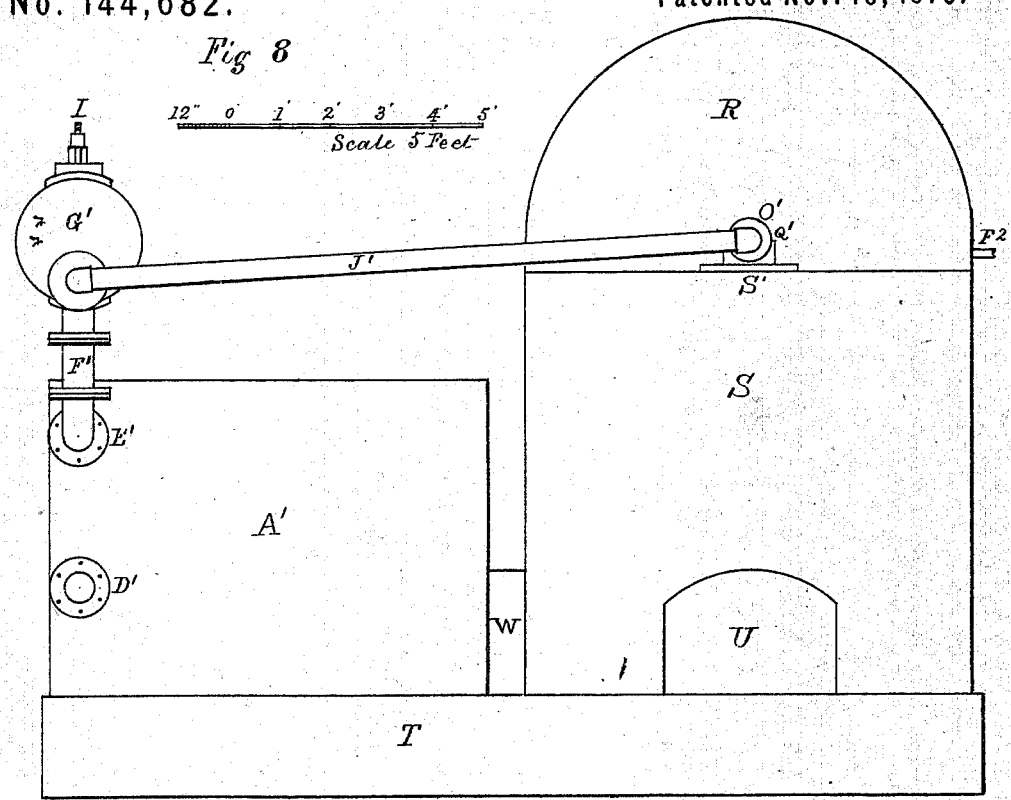
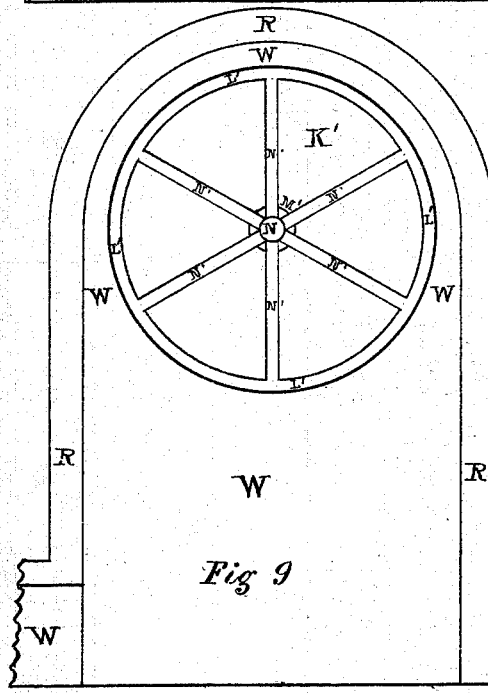
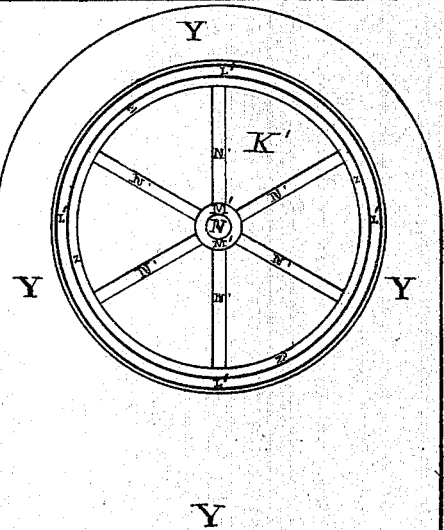

MORRIS L. KEEN, OF JERSEY CITY, NEW JERSEY, ASSIGNOR, BY MESNE ASSIGNMENTS, TO MARY E. KEEN, OF SAME PLACE.

IMPROVEMENT IN FURNACES FOR EVAPORATING ALKALINE SOLUTIONS, &c.

Specification forming part of Letters Patent No. 144,682, dated November 18, 1873; application filed March 15, 1873.

*To all whom it may concern:*

Be it known that I, MORRIS L. KEEN, of Jersey City, in the county of Hudson and State of New Jersey, have invented certain new and useful Improvements in Evaporating - Furnaces; and that the following is a full, clear, and exact description thereof, reference being had to the accompanying drawings making a part of this specification, in which—

Figure 1 represents a side elevation of the furnace. Fig. 2 represents a vertical longitudinal section thereof. Figs. 3 and 4 represent, respectively, the front and rear ends of the furnace. Fig. 5 represents a vertical cross-section through the furnace. Figs. 6, 7, 8, 9, and 10 represent external and sectional views of a revolving auxiliary evaporating cylinder and heating apparatus, arranged for operation in conjunction with the reverberatory evaporating-furnace shown in the other figures.

My invention relates, first, to the construction and operation of the reverberatory evaporating - furnace, as will be hereinafter explained. It further relates to the reverberatory or evaporating furnace, constructed with a water sole or hearth, the water being retained and circulating in a space between two metallic bottoms in connection with a water and steam drum. It further relates to a reverberatory or evaporating furnace constructed with a double jacket evaporating-pan, covering its top, in conjunction with a water and steam drum.

To enable those skilled in the art to make and use my invention, I will proceed to describe the same with reference to the drawings.

The exterior double metallic wall of the furnace is represented at B A Q, Fig. 1, it being divided in the interior into three sections, as shown by corresponding letters in Figs. 2, 3, and 4—that, B, representing the evaporating-pan, that at A representing the calcining-chamber, and that at Q representing the hot-air flue. The base of the furnace is seen at K, in which the ash-pit H is arranged underneath the furnace-door F and grate-bars G, and J is the smoke stack or chimney. At E is represented a series of doors opening into the calcining-chamber A, to admit of the manipulation of the material under treatment. A water and steam drum, M, furnished with a safety-valve, N, man-head or man-hole cover O, and the ordinary try-cocks, is arranged over or above the furnace, and its interior is connected by the pipes P P with the water-space *c c c* around the pan B, so that a free circulation and supply of water may be kept up between the contents of the drum and said water-spaces. A valve, V, is arranged in the bottom of the pan B to allow the charge prepared in said pan to pass into the calcining-chamber A. Water-bridge walls D D extend across the hearth of the calcining-chamber A, which are connected with, and supplied from, the water-space *c* under the calcining-hearth. At L is represented the water-bridge wall of the fire-chamber, which is connected at its ends with, and opens into, the water-space *c* of the side or walls Q surrounding the fire-chamber and hot-air flue. The arrows in the hot-air flue under the calcining-hearth represent the direction in which the heated gases pass through the calcining-chamber A before they pass into and up through the stack J. In Figs. 3, 4, and 5 the curvature of the water-bridge D of the calcining-hearth is shown, and the water-space at *c* is distinctly shown in Fig. 5.

In Figs. 6 to 10 inclusive, is represented the revolving auxiliary evaporating-cylinder, and the heating apparatus for the same, and which may be worked in conjunction with the reverberatory evaporating-furnace above described.

In these drawings, A′ is a brick furnace constituting the fire-chamber and oven for containing a coil of heating-pipes of the usual kind, and in the common well-known way.

The lower range of the coiled pipe may form and constitute the fire-grate, their ends being connected to the manifold pipe D′, and the pipes then lead backward and forward through the oven, and terminate in the upper manifold pipe E′. B′ B′ represent the fire-doors of the furnace, and C′ the ash-pit. A water and steam drum, G′, is arranged over the coil, one end of which is connected with the manifold pipe E′ by means of the pipe F¹, and the other end of the drum G′ is connected to the bottom manifold pipe D′ by the pipe F². A safety-valve, H, and man-hole, or man-hole cover, I, are shown as connected to or with the drum G'. At K' is shown, by sectional view, one end of the revolving evaporator, of which M' is the shaft. This shaft M' is hollow at each end and from the stuffing-box Q' to the intersection of the hollow arms or pipes N' N', which pipes enter the inner shell of the evaporating-cylinder K' and support the same. The water-space L' L' is shown between the double shell of the revolving evaporating-cylinder K', which cylinder forms a flue, having both of its ends open. O' is the journal of the shaft M', and P' is a gear or driving wheel thereon. $J^1$ and $J^2$ are pipes for the circulation of hot water through the shell of the evaporator K' from the coil, the hot-water current entering one end of the cylindrical shell of the evaporator K' by the pipe $J^2$ from the hot-water drum G', and the exhaust or cooler current returning to the coil from the other end of the evaporator K' by the pipe $J^2$ through the bottom manifold pipe D'. The walls of the oven inclosing the evaporating-cylinder K, are shown at R R; and S and S' represent the position of the foundation and pedestal for the support of the revolving cylinder K'. W W shows the hot-air flue by which all the gases and waste heat from the oven of the heating-coil pass in their escape through the evaporating-cylinder K to the stack V', through the passage U. X is the receiving-trough and discharge-outlet for the contracted or concentrated fluid matter passed through the evaporating-chamber K.' T represents the foundation-walls of the apparatus. Z, Fig. 7, is a rib raised on the inside of the cylinder K' to prevent the liquid backing out of that end when it first enters the cylinder; and the cylinder may be set on a slight incline, if so desired or preferred. A hood or division cross-wall, Y, projects between the flue W surrounding the cylinder, and the exit-flue U to the chimney, and neatly incloses, but does not bind, on the cylinder K', or interfere with its revolving, but compels all the spent gases and hot waste air from the coil-furnace to pass under and around the cylinder K' and through the same before reaching the stack.

The furnace is constructed of iron, and may be applied to different uses. It can be used for the rapid evaporation of fluid matter contained in nearly all solutions and magmas, and the recovery of the dry precipitate or product remaining. It is particularly well adapted for the evaporation of saline solutions, soda and potash lyes, and for the manufacture of soda-ash and potash, at the lowest possible cost. The degree of temperature required for any material treated can be so accurately fixed by pressure-gage that the apparatus can be used for the removal of moisture from nearly all materials, and the perfect preservation of the product, in the quickest and cheapest manner. The reverberatory furnace may be used for the concentration of liquid matter, as a preparatory charge for the calcining-chamber.

Having thus fully described my invention, what I claim therein as new, and desire to secure by Letters Patent, is—

1. In combination with the reverberatory evaporating-furnace, constructed, arranged, and operating substantially as herein described, the water sole or hearth composed of two metallic bottoms, as and for the purpose described and represented.

2. The combination of the reverberatory or evaporating furnace with a water sole or hearth, having water retained and circulating in the space between two metallic bottoms, and the water and steam drum connected with said water-space, as and for the purpose described and represented.

3. In combination with the reverberatory or evaporating furnace, having a double-jacket evaporating-pan covering its top, the water and steam drum arranged to operate in connection therewith, as and for the purpose described and represented.

MORRIS L. KEEN.

Witnesses:
E. F. HARTE,
H. B. BLAUVELT.